United States Patent
Lin

(10) Patent No.: US 8,119,945 B2
(45) Date of Patent: Feb. 21, 2012

(54) SELF-ILLUMINATION CIRCUIT BOARD FOR COMPUTER KEYBOARD

(75) Inventor: Chih-Cherng Lin, George Hill (AI)

(73) Assignee: Chicony Electronics Co., Ltd., Taipei Hsien (TW)

( * ) Notice: Subject to any disclaimer, the term of this patent is extended or adjusted under 35 U.S.C. 154(b) by 208 days.

(21) Appl. No.: 12/436,797

(22) Filed: May 7, 2009

(65) Prior Publication Data

US 2010/0282581 A1 Nov. 11, 2010

(51) Int. Cl.
*H01H 9/00* (2006.01)

(52) U.S. Cl. .................................... 200/314

(58) Field of Classification Search .......... 200/310–315, 200/521, 513, 341
See application file for complete search history.

(56) References Cited

U.S. PATENT DOCUMENTS

| | | | |
|---|---|---|---|
| 6,918,677 B2* | 7/2005 | Shipman | 362/26 |
| 7,525,056 B2* | 4/2009 | Chiba et al. | 200/314 |
| 7,608,792 B1* | 10/2009 | Tsai | 200/310 |
| 7,709,760 B2* | 5/2010 | Chen et al. | 200/314 |

\* cited by examiner

*Primary Examiner* — Edwin A. Leon
(74) *Attorney, Agent, or Firm* — Muncy, Geissler, Olds & Lowe, PLLC

(57) ABSTRACT

A self-illumination circuit board includes a double-layer substrate structure, a circuit layer embedded in the substrate structure and carrying a circuit layout, side-emitting light sources mounted in the substrate structure and electrically connected to the circuit layout for emitting light sideways, and light guide plates embedded in the substrate structure and respectively disposed adjacent to the side-emitting light sources for uniformly distributing light emitted from the side-emitting light sources over respective light exit surfaces thereof. The invention also provides a self-illumination keyboard using the self-illumination circuit board.

18 Claims, 13 Drawing Sheets

SELF-ILLUMINATION CIRCUIT BOARD FOR COMPUTER KEYBOARD

BACKGROUND OF THE INVENTION

1. Field of the Invention

The present invention relates to computer keyboards and more particularly, to a self-illumination circuit board for computer keyboard. The invention relates also to a self-illumination keyboard using such a self-illumination circuit board.

2. Description of the Related Art

Following fast development of computer-related technology, many practical and functional electronic products have been continuously created and have appeared on the market. Most commercial electronic products have an input device made in the form of a mouse, keyboard, joystick or light gun for data or command entry. For different applications, different computer keyboards shall be used. For example, a keyboard for notebook computer is quite different from the configuration of a keyboard for desk computer. A notebook computer has light, thin, short and small characteristics. Therefore, the key switch structure of a keyboard for desk computer cannot be directly used in a keyboard for notebook computer. It must be specially configured to fit the requirements for notebook computer.

A conventional key switch structure for computer keyboard has a linking mechanism provided between a key cap and a bottom board to support vertical movement of the key cap. The linking mechanism may be made in the form of a cross-linkage (scissors-structure), rotary shaft structure or sliding structure. FIG. 13 illustrates an illuminated keyboard structure according to the prior art. According to this design, the illuminated keyboard comprises a key switch unit A and a backlight unit B. The key switch unit A includes a bottom board A1, a circuit board A2 supported on the bottom board A1 and carrying a light emitting device A21, a membrane A3 located on the top side of the circuit board A2 and carrying a light transmission rubber cone A31, a key cap A5, and a linking mechanism A4 coupled between the bottom board A1 and the key cap A5 around the rubber cone A31.

The backlight unit B includes a light guide board B1 provided at the bottom side of the bottom board A1, and a reflector B2 located on the bottom side of the light guide board B1.

The light emitting device A21 emits light toward the bottom side. The reflector B2 reflects light from the light guide board B1 toward the key switch unit A to light up the key cap A5. Therefore, a user can see the key cap A5 clearly when it is dark.

The aforesaid illuminated keyboard structure is functional, however it still has drawbacks as follows:

1. The light emitted from the light emitting device A21 at the circuit board A2 is projected onto the key cap A5 after through multiple reflection and refraction actions, resulting in energy loss. Thus, the illumination at the key cap A5 is weak.

2. The arrangement of the backlight unit B greatly increases the height of the keyboard structure, thus the keyboard structure is not suitable for use in an electronic product having light, thin, short and small characteristics.

3. The bottom board A1 has support members inserted through respective openings on the circuit board A2 and respective openings on the membrane A3 for the connection of the linking mechanism A4. The presence of the openings on the circuit board A2 limits the design of the circuit layout on the circuit board A2 and complicates the fabrication of the circuit board A2.

4. The key switch unit A can be made having pressure pads to substitute for the arrangement of the circuit board A2, membrane A3, linking mechanism A4 and key cap A5. However, the installation of the pressure pads and arrangement of circuits in the pressure pads are complicated, and the relative manufacturing cost is high.

Therefore, it is desirable to provide a self-illumination circuit board/keyboard that eliminates the aforesaid drawbacks.

SUMMARY OF THE INVENTION

The present invention has been accomplished under the circumstances in view. It is the main object of the present invention to provide a self-illumination circuit board for computer keyboard, which has a low-profile characteristic. It is another object of the present invention to provide a self-illumination circuit board for computer keyboard, which provides an enhanced illumination effect.

To achieve these and other objects of the present invention, a self-illumination circuit board for computer keyboard comprises a substrate structure, a circuit layer embedded in the substrate structure and carrying a circuit layout, side-emitting light source means mounted in the substrate structure and electrically connected to the circuit layout for emitting light sideways, and light guide means embedded in the substrate structure and respectively disposed adjacent to the side-emitting light source means for uniformly distributing light emitted from the side-emitting light source means over respective light exit surfaces thereof.

Further, the substrate structure comprises a relatively thinner upper substrate and a relatively thicker bottom substrate arranged in a stack. Further, the circuit layer is sandwiched between the relatively thinner upper substrate and the relatively thicker bottom substrate. Further, the light guide means is set in between the relatively thicker bottom substrate and the circuit layer and adapted to distribute light emitted from the light source means over the circuit layer and the relatively thinner upper substrate.

DETAILED DESCRIPTION OF THE PREFERRED EMBODIMENT

Figure 1:
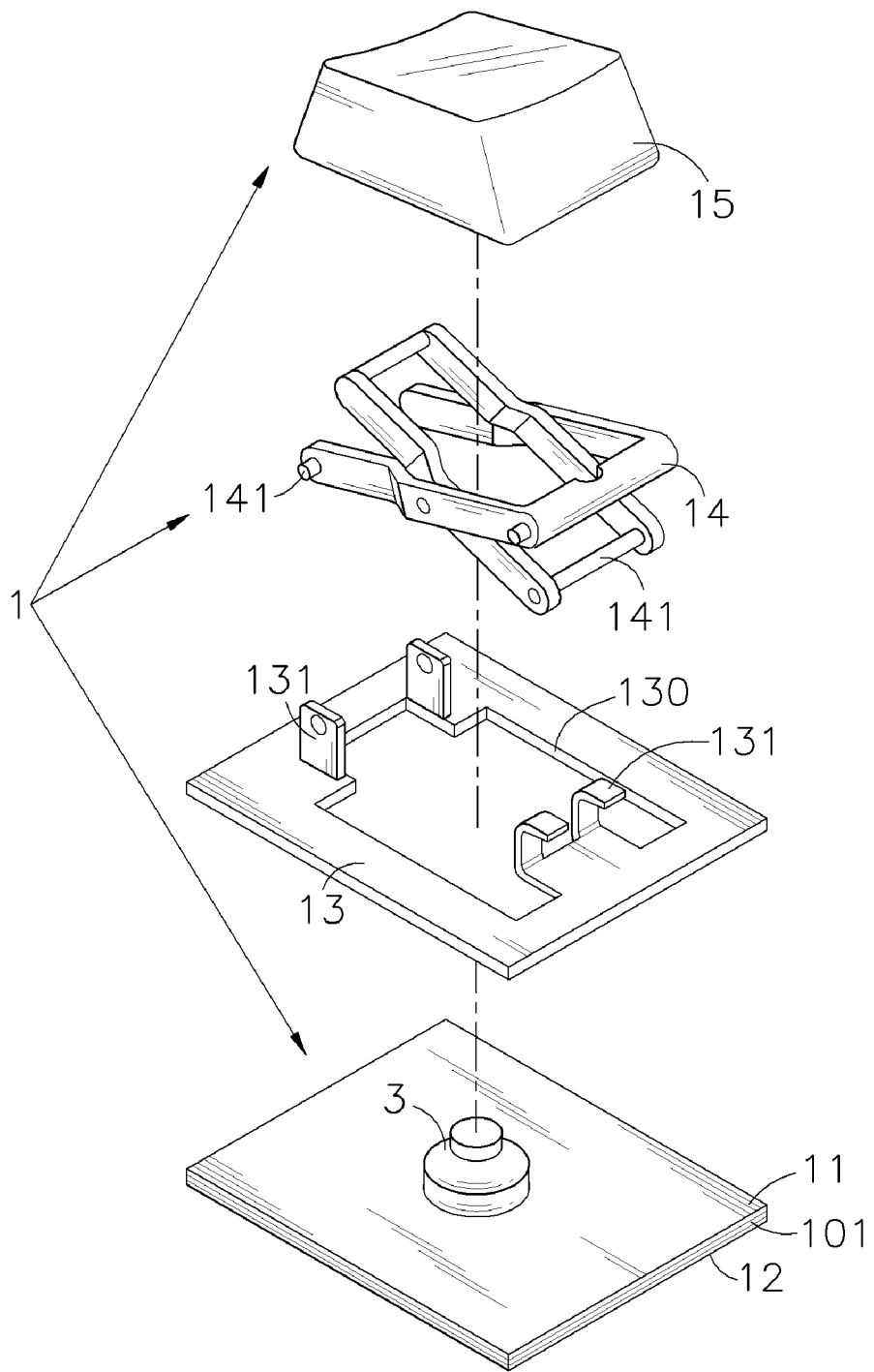
FIG. 1 is an exploded view of a part of a self-illumination keyboard constructed according to the present invention.
Figure 2:
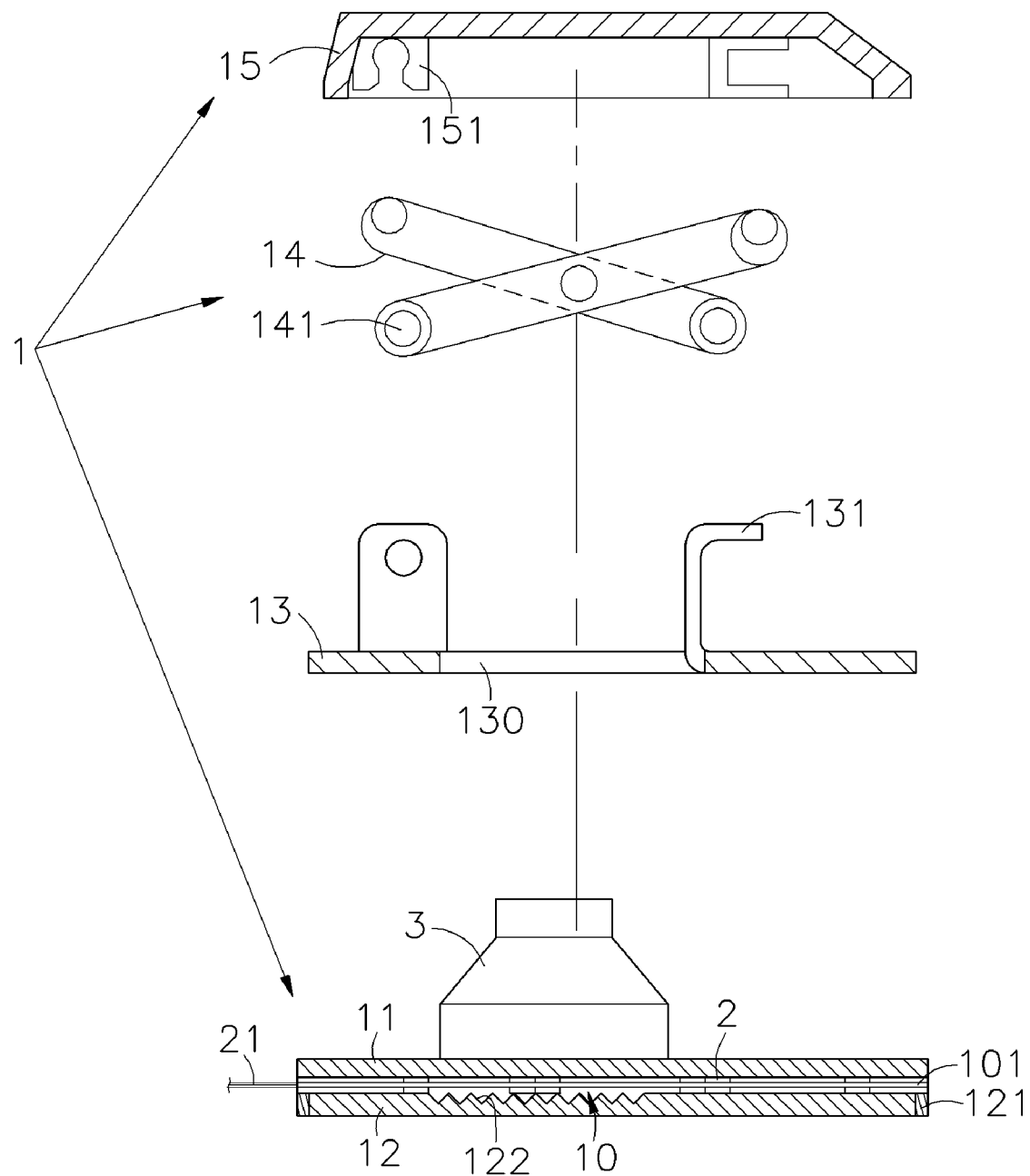
FIG. 2 is a sectional side view of FIG. 1.
Figure 3:
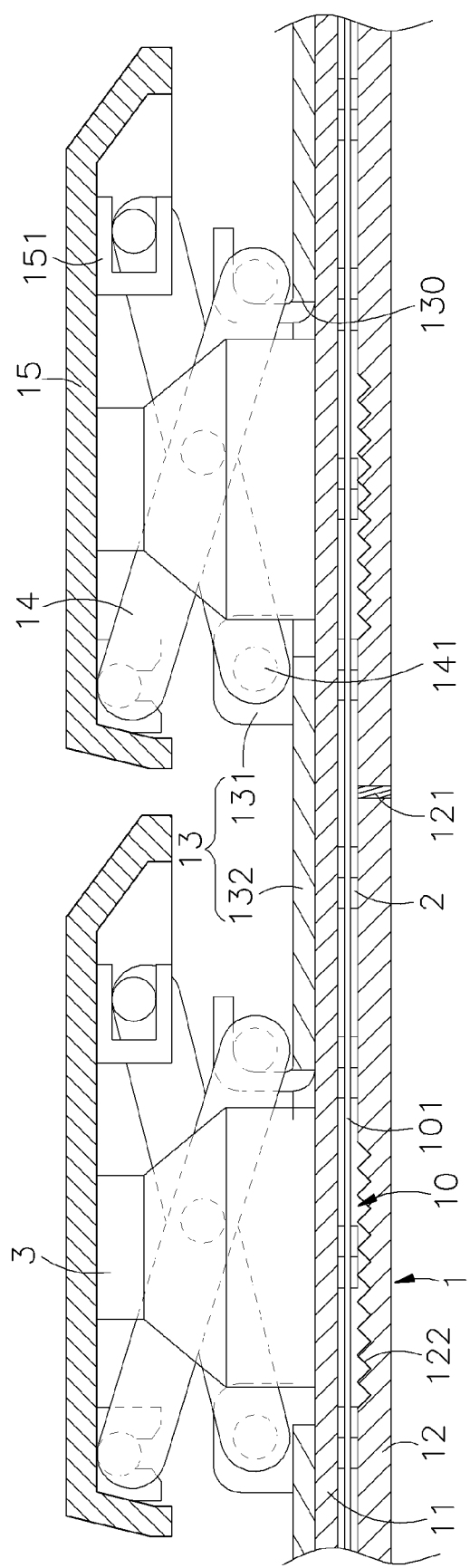
FIG. 3 is a schematic sectional side view of a part of the self-illumination keyboard according to the present invention.
Figure 4:
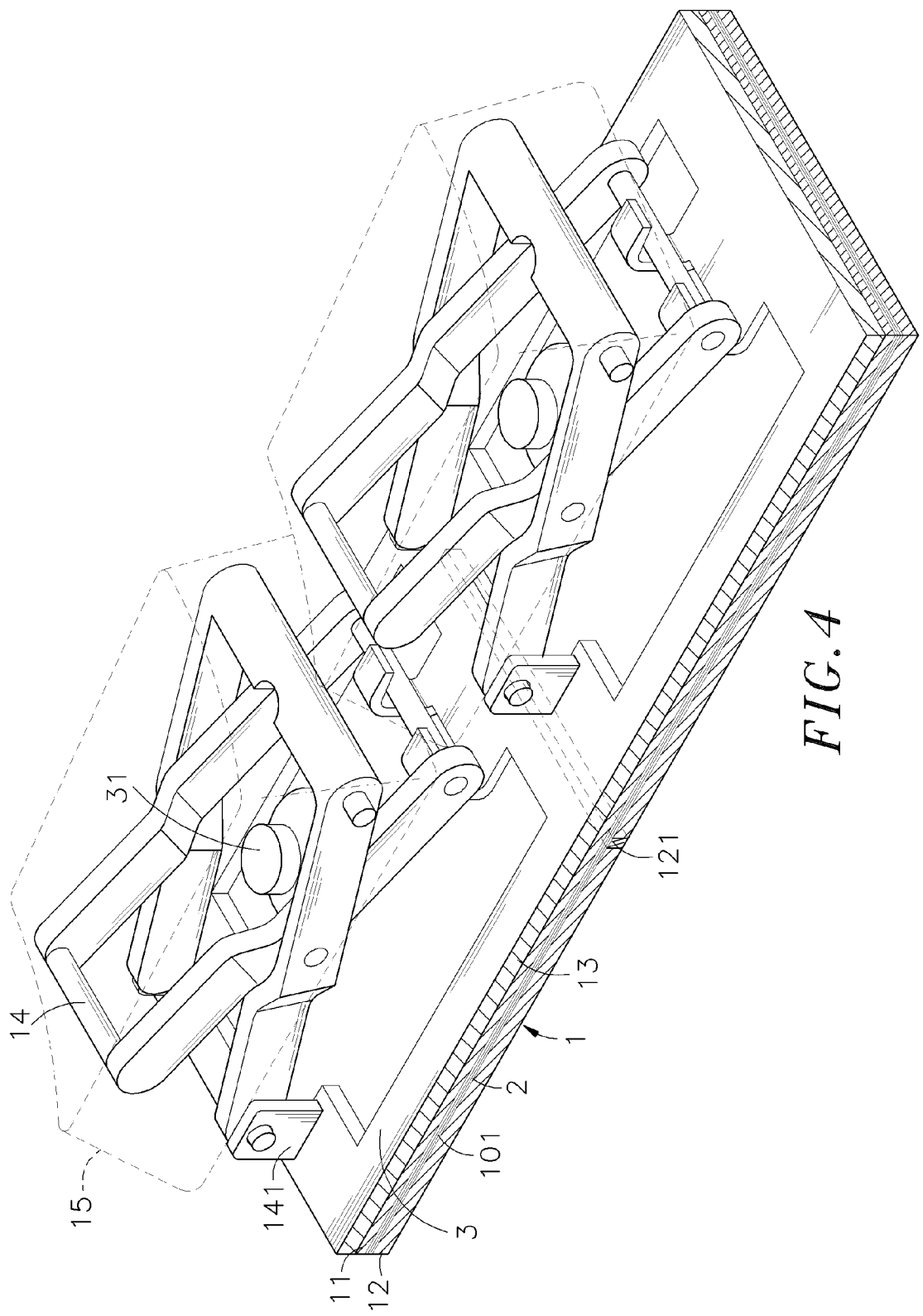
FIG. 4 is a perspective sectional elevation of a part of the self-illumination keyboard according to the present invention.

Referring to FIGS. 1~4, a self-illumination keyboard in accordance with one embodiment of the present invention is shown comprising a self-illumination circuit board 1 carrying therein a circuit layer 2.

The self-illumination circuit board 1 comprises an upper substrate 11 and a bottom substrate 12. The upper substrate 11 and the bottom substrate 12 are made of a transparent or semi-transparent material, and arranged in a stack. A plurality of light sources 121 are mounted in the bottom substrate 12. A plurality of light guide plates 122 are mounted on the top side of the bottom substrate 12 beneath the upper substrate 11 and respectively disposed adjacent to the light sources 121 for distributing light from the respective adjacent light sources 121 into the whole area of the top (or bottom) side thereof. An insulative isolation layer 101 is set in between the upper substrate 11 and the bottom substrate 12 and covered over the light guide plates 122. Further, an accommodation space 10 is defined between the upper substrate 11 and the bottom substrate 12.

The circuit layer 2 can be a flexible circuit board having a circuit layout formed of signal and power circuits and prepared from a silver paste layer so that the thickness of the circuit layer 2 is minimized. The circuit layout of the circuit layer 2 has a connection portion 21 extended out of the circuit layer 2 for connection to an external power source.

Figure 9:
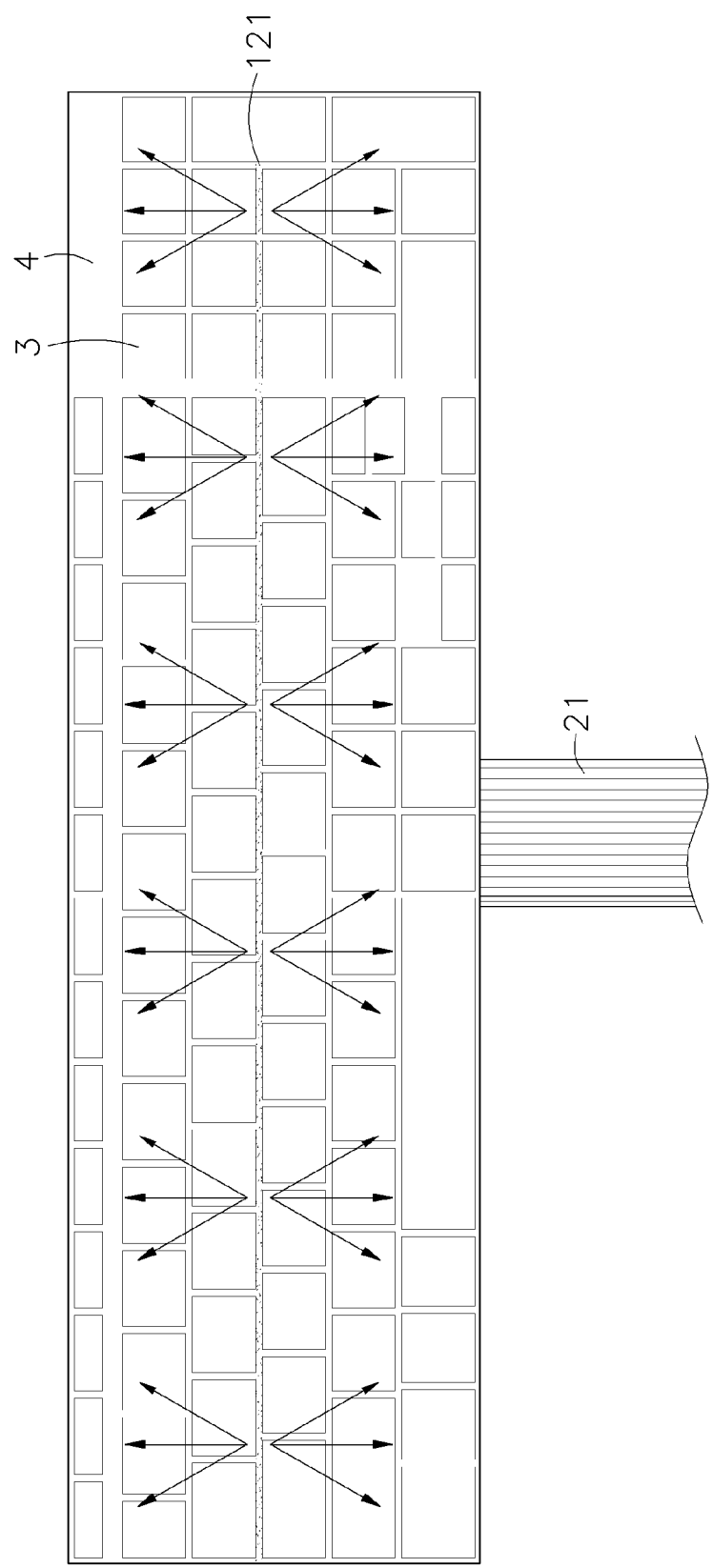
FIG. 9 is a schematic top view of the present invention, showing one arrangement example of the light sources in the self-illumination keyboard.
Figure 10:
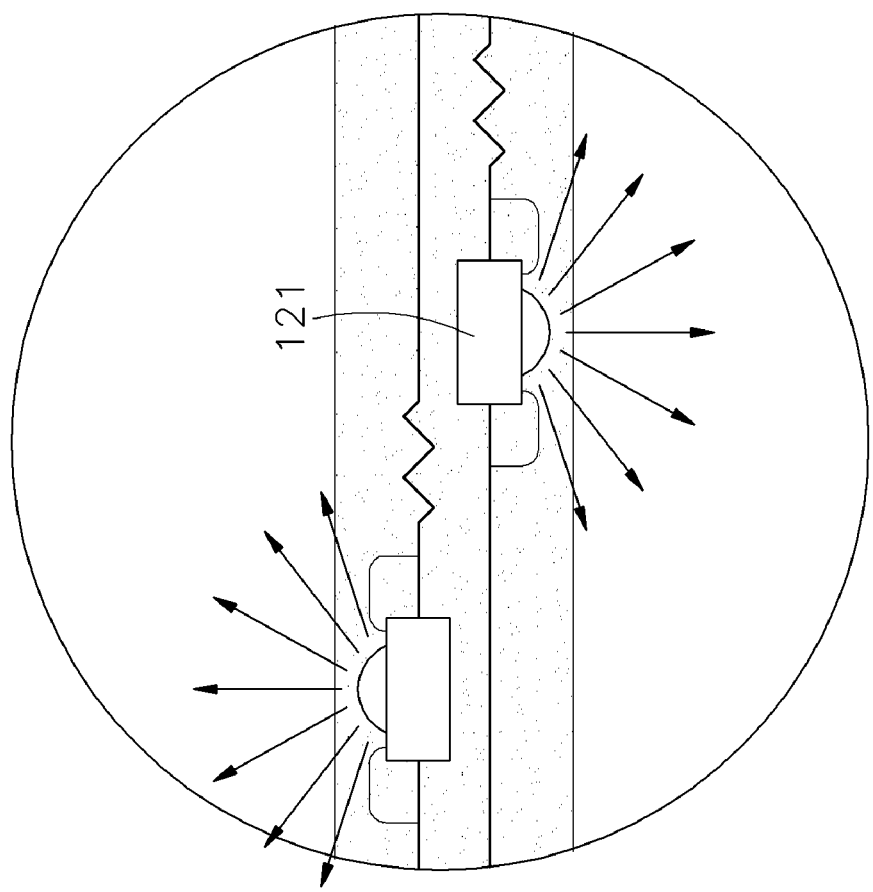
FIG. 10 is a schematic drawing of a part of the self-illumination circuit board according to the present invention, showing two light sources arranged in reversed directions in a stagger manner.
Figure 11:
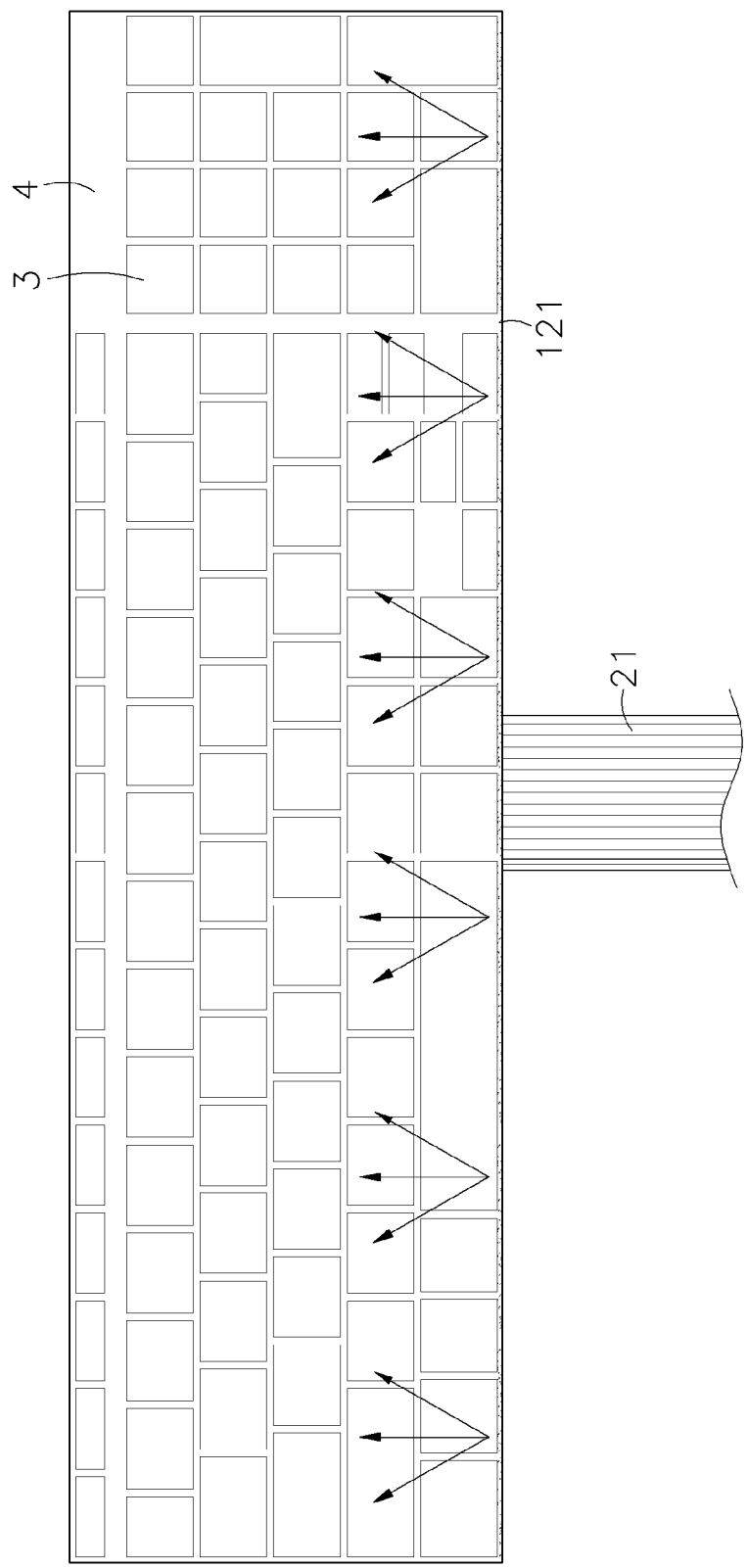
FIG. 11 is a schematic top view of the present invention, showing another arrangement example of the light sources in the self-illumination keyboard.
Figure 12:
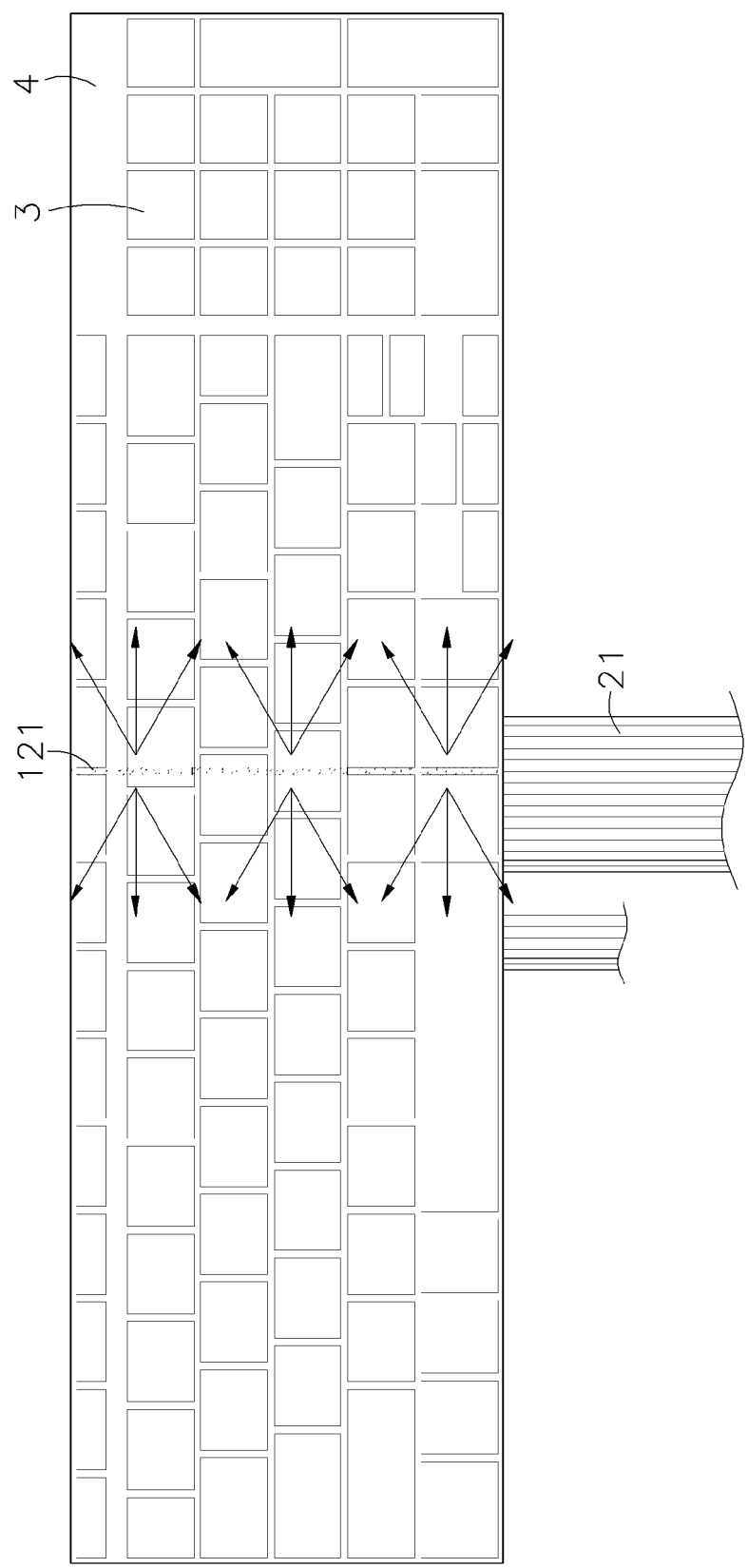
FIG. 12 is a schematic top view of the present invention, showing still another arrangement example of the light sources in the self-illumination keyboard.
Figure 13:
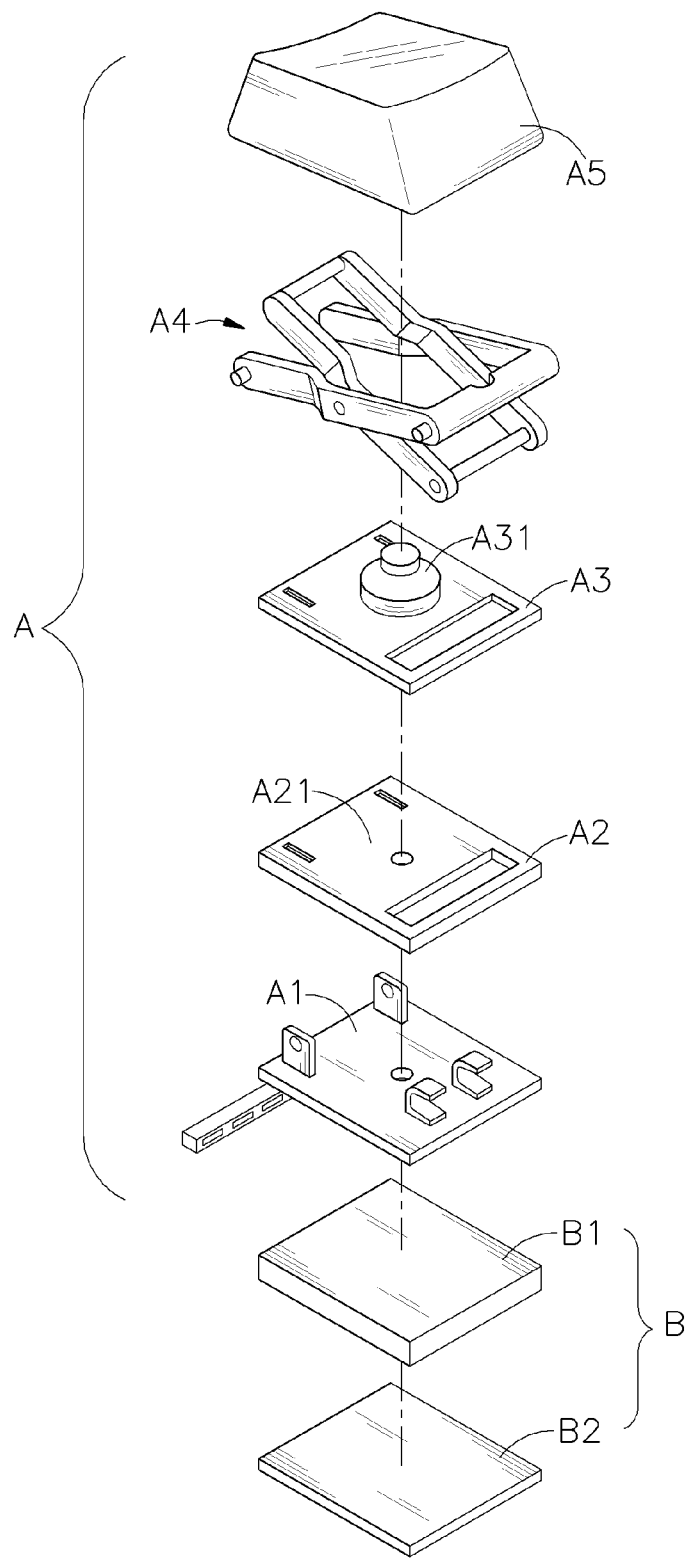
FIG. 13 is an exploded view of an illuminated keyboard structure for computer keyboard according to the prior art.

During installation, the circuit layer 2 is positioned in the accommodation space 10 between the upper substrate 11 and the bottom substrate 12 and protected by the insulative isolation layer 101 and electrically connected with the light sources 121. Thereafter, the connection portion 21 of the circuit layer 2 is connected to an external power source. When electrically connected, the light sources 121 emit light into the lateral incident surfaces of the respective adjacent light guide plates 122 that guide incident light rays toward the top (or bottom) emitting surfaces thereof. As shown in FIGS. 9, 11 and 12, the light sources 121 can be arranged in the keyboard at selected locations. Further, the light sources 121 can be side-emitting light emitting diodes that emit light sideways into the lateral incident surfaces of the respective light guide plates 122. By means of the side-emitting characteristics of the light sources 121 and the effect of the light guide plates 122, light is evenly guided through the upper substrate 11 toward the outside, enhancing the illumination performance of the self-illumination keyboard.

The upper substrate 11 and bottom substrate 12 of the circuit board 1 have different thicknesses. According to this embodiment, the thickness of the upper substrate 11 is greater than the bottom substrate 12. Alternatively, the bottom substrate 12 can be made relatively thicker than the upper substrate 11. The upper substrate 11 and the bottom substrate 12 can be prepared from polycarbonate (PC), polyethylene terephthalate (PET), polymethyl methacrylate (PMMA) or any other suitable flexible material. Further, the insulative isolation layer 101 is prepared from a transparent or semi-transparent material that admits light.

Further, the aforesaid circuit layer 2 can be a flexible circuit board formed of two layers each carrying a respective circuit layout. The two layers are bonded together with a conducting adhesive. Alternatively, the circuit layer 2 can be made by means of folding up a single layer structure that carries two circuit layouts and then bonding the folded single layer structure with a conducting adhesive in shape.

Figure 5:
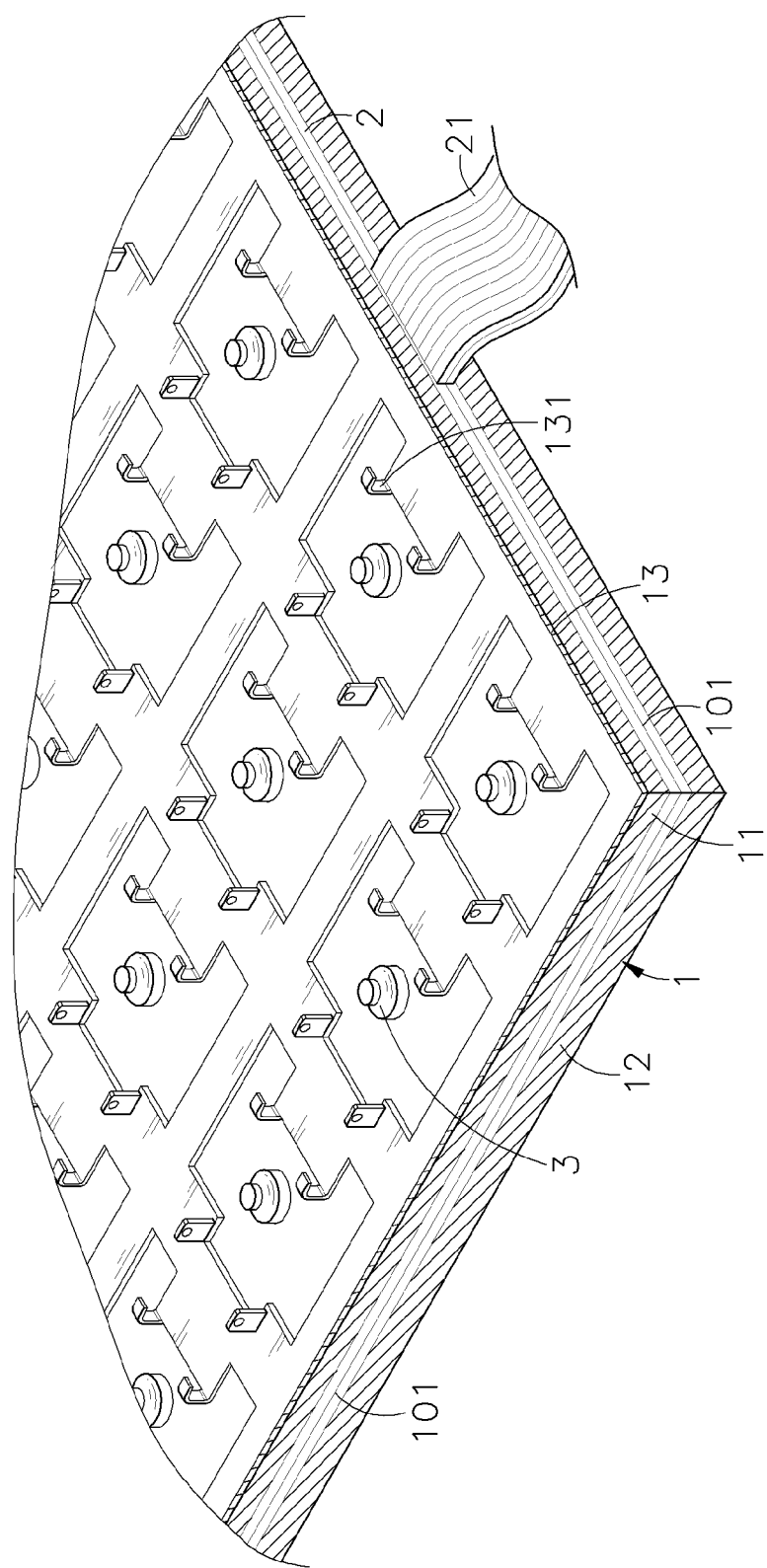
FIG. 5 is a sectional elevation of a part of the self-illumination keyboard according to the present invention.
Figure 6:
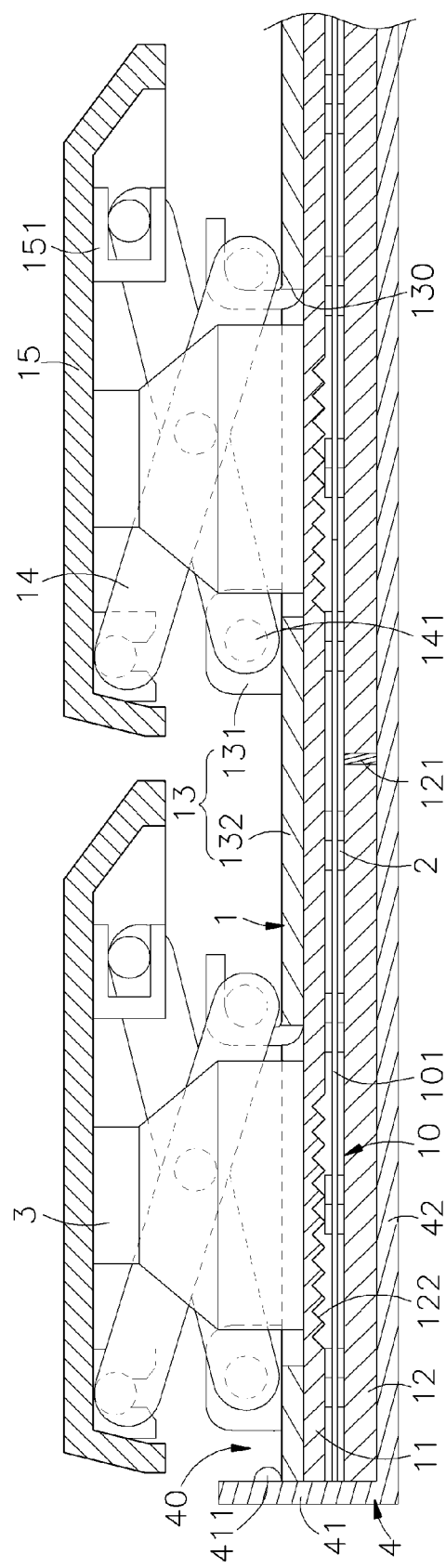
FIG. 6 corresponds to FIG. 3, showing another arrangement example of the light guide plate in the self-illumination circuit board.

Referring to FIGS. 5 and 6 and FIGS. 1 and 2 again, the self-illumination keyboard further comprises a bottom frame 4 carrying a reflector 42. The bottom frame 4 has an upright peripheral wall 41. The upright peripheral wall 41 defines an accommodation chamber 40 above the reflector 42 for accommodating the circuit board 1. Further, a board member 13 is attached to the top surface of the upper substrate 11 of the circuit board 1 and secured in place by protruding retaining portions 411 at the upright peripheral wall 41 of the bottom frame 4. The board member 13 has a plurality of openings 130, and multiple sets of pivot holders 131 respectively arranged around the openings 130. hollow rubber cones 3 are respectively mounted on the upper substrate 11 of the circuit board 1 and accommodated in the openings 130 of the board member 13 to support respective key caps 15. Further, actuating devices 14 are set between the board member 13 and the key caps 15 to stabilize vertical movement of the key caps 15 relative to the board member 13, each having top and bottom pivot axles 141 respectively pivotally coupled to bottom pivot holders 151 of the key caps 15 and the pivot holders 131 of the board member 13. During operation of the self-illumination keyboard, the reflector 42 reflects light from the light sources 121 upwards through the circuit board 1 and the key caps 15. Further, because the board member 13 is held on the top surface of the upper substrate 11 of the circuit board 1 by the protruding retaining portions 411 at the upright peripheral wall 41 of the bottom frame 4, it holds down the circuit board 1 in the bottom frame 4 firmly in place, avoiding damage during transportation.

Further, the substrates 11 and 12 and circuit layer 2 of the circuit board 1 are arranged beneath the board member 13. The circuit board 1 does not have any through hole cut through the substrates 11 and 12 and the circuit layer 2, therefore the substrates 11 and 12 and the circuit layer 2 provide a broad surface area for the arrangement of the circuit layout. This broad surface area facilitates the design of the circuit layout, thereby simplifying the fabrication of the keyboard. Further, the isolation effect of the insulative isolation layer 101 well protects the circuit board 1 against corrosion.

Further, the aforesaid key caps 15 can be made of a transparent or semi-transparent material. The top surface of each key cap 15 can be covered with a coating and marked with a pattern or design by means of a laser-engraving technique. When a user presses one key cap 15, the associating rubber cone 3 is compressed to trigger the circuit board 1, causing the circuit layer 2 to output a corresponding switching signal.

Figure 7:
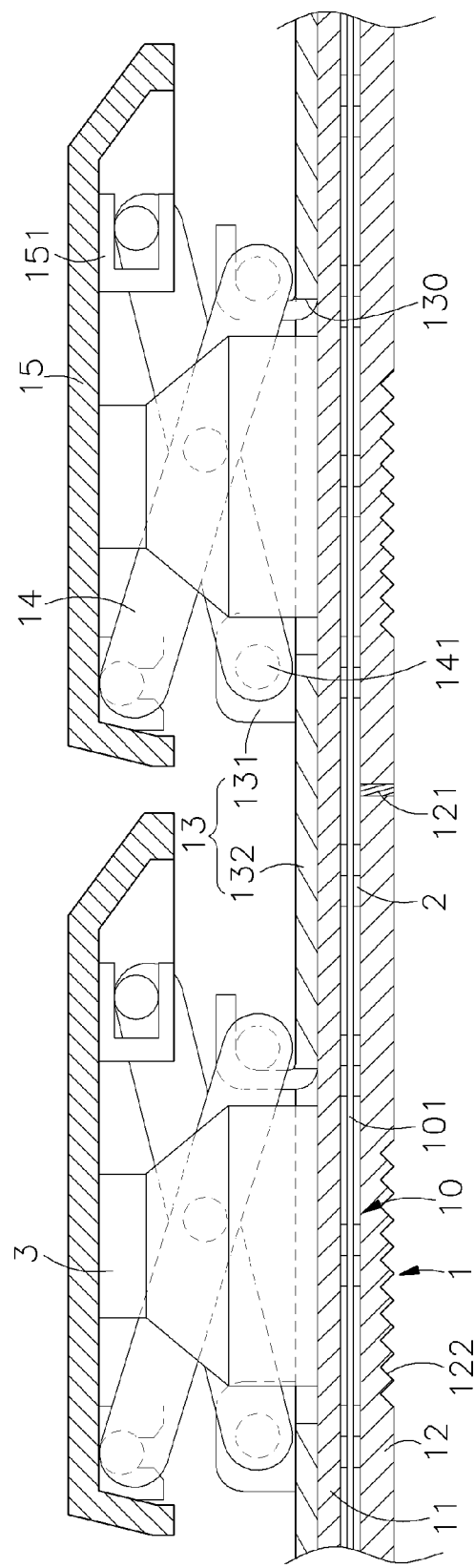
FIG. 7 corresponds to FIG. 3, showing still another arrangement example of the light guide plate in the self-illumination circuit board.
Figure 8:
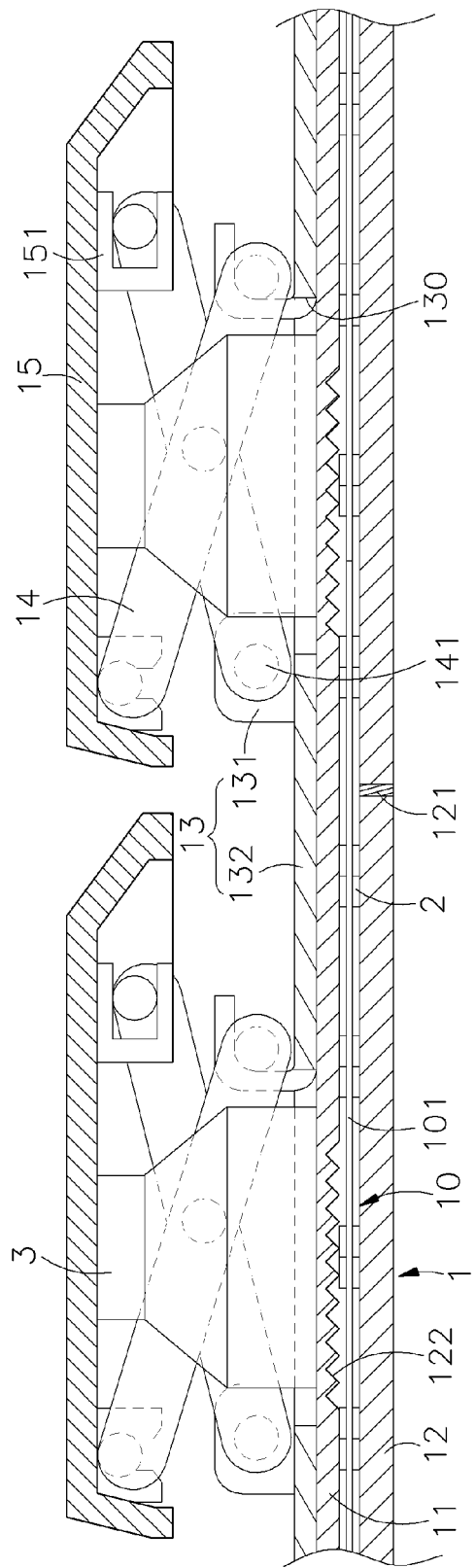
FIG. 8 corresponds to FIG. 3, showing still another arrangement example of the light guide plate in the self-illumination circuit board.

Referring to FIGS. 7 and 8 and FIGS. 3 and 6 again, the light sources 121 can be mounted in the upper substrate 11 or bottom substrate 12, and the light guide plates 122 can be mounted on the top or bottom sides of the upper substrate 11 or bottom substrate 12 to match the light sources 121. For example, the light sources 121 can be installed in the bottom substrate 12 in vertical, and the light guide plates 122 can be installed in the upper substrate 11 to uniformly distribute the light over respective light exit surfaces thereof for illuminating the key caps 15. Each light guide plate 122 can be made having a serrated or wave-like light guide surface or a number of light guide spots for concentrating light. Light guide ink may be printed on the light guide plates 122 for concentrating light. When the light sources 121 are electrically connected to emit light, the light guide plates 122 uniformly distribute the light over respective light exit surfaces thereof, and the reflector 42 reflects the light toward the key caps 15.

Further, as stated above, the rubber cones 3 are respectively mounted on the upper substrate 11 of the circuit board 1 and accommodated in the openings 130 of the board member 13 to support the respective key caps 15, and the actuating devices 14 are coupled between the board member 13 and the key caps 15 to stabilize vertical movement of the key caps 15 relative to the board member 13. When one key cap 15 is pressed, the associating actuating device 14 is lowered for enabling the associating rubber cone 3 to be compressed by the key cap 15 to trigger the circuit board 1, causing the circuit layer 2 of the circuit board 1 to output a corresponding switching signal. When released the pressure from the key cap 15, the associating rubber cone 3 immediately returns to its former shape subject to its elastic material property, thereby returning the key cap 15 and the associating actuating device 14 to their former position. By means of the functioning of the associating actuating device 14, the key cap 15 is kept in balance during its up or down stroke. Further, any other suitable means, for example, pressure pads may be used to substitute for the structure of the actuating devices 14, the key caps 15 and the rubber cones 3 for pressing by a user to trigger the circuit layer 2 of the circuit board 1 in outputting respective switching signals, i.e., the self-illumination keyboard can be made in the form of a membrane keyboard of which the keys are pressure pads that have only outlines and symbols printed on a flat, flexible surface thereof.

Further, the circuit layer 2 is a thin sheet member that does not occupy much space in between the upper substrate 11 and the bottom substrate 12. Therefore, the accommodation space 10 can be made having a low profile characteristic, and the thickness of the circuit board 1 can be minimized. When one rubber cone 3 is compressed by the associating key cap 15 to impart a pressure on the upper substrate 11 of the circuit board 1, the pressure is effectively transferred through the insulative isolation layer 101 to trigger a corresponding switching contact at the circuit layout of the circuit layer 2, causing the circuit layer 2 to output a corresponding switching signal. When the external pressure is disappeared, the rubber cone 3 immediately returns the associating key cap 15 to its former position. Further, the board member 13 has shading portions 132 corresponding to the gap between each two adjacent key caps 15. The shading portions 132 prevent light rays emitted from the light sources 121 from passing through the gap between each two adjacent key caps 15 so that light rays emitted from the light sources 121 are gathered onto the key caps 15.

Referring to FIGS. 9~12 and FIG. 3 again, the light sources 121 can be LED (light emitting diode) light sources mounted in the circuit board 1 by means of SMT (surface mount technology), and arranged in the same or different directions. For example, the light sources 121 can be arranged in one single row in the same direction, or in two parallel rows in reversed directions, or in two rows in a staggered manner in reversed directions. When the light sources 121 are electrically connected, they light up the circuit board 1 and the key caps 15.

In conclusion, the invention provides a self-illumination keyboard, which has the following advantages and features:

1. The light sources 121 can be installed in the bottom substrate 12 of the circuit board 1 to emit light sideways so that light rays emitted from the light sources 121 are uniformly distributed over the whole area of the circuit board 1 without refraction, avoiding energy loss. Therefore, the invention gives rise to a very good luminance performance.

2. The circuit board 1 has the circuit layer 2 and the light sources 121 embedded therein so that the thickness of the circuit board 1 can be minimized, meeting the design concept of electronic products having light, thin, short and small characteristics.

3. The circuit layer 2 is embedded in the circuit board 1 and carries the desired circuit layout. Therefore, it is not necessary to make via holes on the circuit board 1 for circuit arrangement.

4. The installation of the circuit layer 2 and the light sources 121 in the circuit board 1 can easily be achieved without any further extra processing process, saving much labor and time and assuring excellent illumination effect.

A prototype of self-illumination circuit board and self-illumination keyboard using same has been constructed with the features of FIGS. 1~12. The self-illumination circuit board and self-illumination keyboard using same functions smoothly to provide all of the features disclosed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A self-illumination circuit board, comprising:
a substrate structure;
a circuit layer embedded in said substrate structure and carrying a circuit layout;
side-emitting light source means mounted in said substrate structure and electrically connected to said circuit layout for emitting light sideways; and
light guide means embedded in said substrate structure and respectively disposed adjacent to said side-emitting light source means for uniformly distributing light emitted from said side-emitting light source means over respective light exit surfaces thereof;
wherein said substrate structure comprises a relatively thinner upper substrate and a relatively thicker bottom substrate arranged in a stack; said circuit layer is sandwiched between said relatively thinner upper substrate and said relatively thicker bottom substrate; said light guide means is set in between said relatively thicker bottom substrate and said circuit layer and adapted to distribute light emitted from said light source means over said circuit layer and said relatively thinner upper substrate.

2. The self-illumination circuit board as claimed in claim 1, wherein said side-emitting light source means comprises at least one light emitting diode mounted in said relatively thicker bottom substrate by surface mount technology.

3. The self-illumination circuit board as claimed in claim 1, wherein said relatively thinner upper substrate and said relatively thicker bottom substrate are respectively prepared from a light transmission flexible material selected from a group of polycarbonate, polyethylene terephthalate and polymethyl methacrylate.

4. The self-illumination circuit board as claimed in claim 1, wherein said liquid guide means comprises at least one light guide plate each having a plurality of light guide spots.

5. The self-illumination circuit board as claimed in claim 1, wherein said liquid guide means comprises at least one light guide plate each having a serrated light guide surface.

6. The self-illumination circuit board as claimed in claim 1, wherein said liquid guide means comprises at least one light guide plate each having a wave-like light guide surface.

7. The self-illumination circuit board as claimed in claim 1, wherein said liquid guide means comprises at least one light guide plate each having a light guide ink printed thereon.

8. A self-illumination keyboard comprising:

a self-illumination circuit board, said self-illumination circuit board comprising a substrate structure, a circuit layer embedded in said substrate structure and carrying a circuit layout, a side-emitting light source means mounted in said substrate structure and electrically connected to said circuit layout for emitting light sideways and light guide means embedded in said substrate structure and respectively disposed adjacent to said side-emitting light source means for uniformly distributing light emitted from said side-emitting light source means over respective light exit surfaces thereof; and a key switch structure arranged on a top side of said circuit board for pressing by a user against said circuit board to selectively trigger different switching contacts of said circuit layout in producing different switching signals;

wherein said substrate structure comprises a relatively thinner upper substrate and a relatively thicker bottom substrate arranged in a stack; said circuit layer is sandwiched between said relatively thinner upper substrate and said relatively thicker bottom substrate; said light guide means is set in between said relatively thicker bottom substrate and said circuit layer and adapted to distribute light emitted from said light source means over said circuit layer and said relatively thinner upper substrate.

9. The self-illumination keyboard as claimed in claim 8, wherein said light source means comprises at least one light emitting diode mounted in said relatively thicker bottom substrate by surface mount technology.

10. The self-illumination keyboard as claimed in claim 8, wherein said relatively thinner upper substrate and said relatively thicker bottom substrate are respectively prepared from a light transmission flexible material selected from a group of polycarbonate, polyethylene terephthalate and polymethyl methacrylate.

11. The self-illumination keyboard as claimed in claim 8, wherein said liquid guide means comprises at least one light guide plate each having a plurality of light guide spots.

12. The self-illumination keyboard as claimed in claim 8, wherein said liquid guide means comprises at least one light guide plate each having a serrated light guide surface.

13. The self-illumination keyboard as claimed in claim 8, wherein said liquid guide means comprises at least one light guide plate each having a wave-like light guide surface.

14. The self-illumination keyboard as claimed in claim 8, wherein said liquid guide means comprises at least one light guide plate each having a light guide ink printed thereon.

15. The self-illumination keyboard as claimed in claim 8, wherein said key switch structure comprises: a light transmission board member covered on a top surface of said self-illumination circuit board, said light transmission board member having a plurality of openings; a plurality of rubber cones mounted on the top surface of said self-illumination circuit board and respectively positioned in said openings of said light transmission board member; and a plurality of key caps respectively supported on said rubber cones for pressing by a user to compress the associating rubbers cones and to further trigger said circuit layer in producing respective switching signals.

16. The self-illumination keyboard as claimed in claim 15, wherein said light transmission board member has a plurality of light shading portions adapted to prevent light rays emitted from said light source means from radiating through gaps in between each two adjacent key caps.

17. The self-illumination keyboard as claimed in claim 15, wherein said key switch structure further comprises a plurality of actuating devices respectively coupled between said light transmission board member and said key caps to stabilize vertical movement of said key caps relative to said light transmission board member.

18. The self-illumination keyboard as claimed in claim 15, wherein said key switch structure comprises a plurality of pressure pads that have outlines and symbols printed on a flat, flexible surface thereof.

\* \* \* \* \*